United States Patent
Guern (10) Patent No.: US 8,332,185 B2
(45) Date of Patent: Dec. 11, 2012

(54) METHOD AND SYSTEM FOR CALCULATING ELEMENTARY SYMMETRIC FUNCTIONS OF SUBSETS OF A SET

(75) Inventor: Jerry A. Guern, San Diego, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 471 days.

(21) Appl. No.: 12/542,507

(22) Filed: Aug. 17, 2009

(65) Prior Publication Data

US 2011/0040525 A1 Feb. 17, 2011

(51) Int. Cl.
*G06F 17/11* (2006.01)
*G06F 19/00* (2011.01)
*G06F 17/40* (2006.01)

(52) U.S. Cl. .......... 702/189; 73/432.1; 73/866.3; 702/1; 702/127; 702/187; 708/105; 708/446

(58) Field of Classification Search ............. 73/432.1, 73/866.3; 702/1, 127, 179, 181, 187, 189; 708/100, 105, 131, 160, 200, 446
See application file for complete search history.

(56) References Cited

U.S. PATENT DOCUMENTS

| | | | | |
|---|---|---|---|---|
| 8,046,362 B2 * | 10/2011 | Bayliss | .......... | 707/737 |
| 8,135,680 B2 * | 3/2012 | Bayliss | .......... | 707/688 |
| 2009/0271359 A1 * | 10/2009 | Bayliss | .......... | 706/54 |
| 2009/0271405 A1 * | 10/2009 | Bayliss | .......... | 707/6 |

OTHER PUBLICATIONS

Merriam-Webster On Line Dictionary, definition of "symmetric", downloaded on Jan. 24, 2012 from .mirriam-webster.com/dictionary/symmetric.*

* cited by examiner

*Primary Examiner* — Edward Cosimano
(74) *Attorney, Agent, or Firm* — Marsh Fischmann & Breyfogle LLP (57) ABSTRACT

A method and system that calculate elementary symmetric functions of subsets of a set $\{Z\}$ comprising a total of m numerical elements in an $m^2$ time-frame. In one embodiment the method comprises: receiving (310) a set $\{Z\}$ comprising a total of m numerical elements, wherein $z(i)$ denotes the ith element of set $\{Z\}$ indexed by number i; obtaining (320) a plurality of elementary symmetric functions for set $\{Z\}$, wherein $esf(j)$ denotes the jth elementary symmetric function of set $\{Z\}$ indexed by number j; and determining (330) a plurality of secondary symmetric functions for set $\{Z\}$, wherein for each value of index i, $ssf(j,i)$ denotes the jth elementary symmetric function of a subset $\{Z\backslash z(i)\}$ comprising set $\{Z\}$ with element $z(i)$ removed from set $\{Z\}$, and wherein for a particular value of index i, the secondary symmetric functions are determined in accordance with a recursive relationship among the secondary symmetric function to be determined, a previously determined secondary symmetric function, one of the obtained elementary symmetric functions, and the element $z(i)$ removed from set $\{Z\}$.

25 Claims, 7 Drawing Sheets

METHOD AND SYSTEM FOR CALCULATING ELEMENTARY SYMMETRIC FUNCTIONS OF SUBSETS OF A SET

FIELD OF THE INVENTION

The present invention relates generally to calculating elementary symmetric functions, and more particularly to efficient calculation of elementary symmetric functions of subsets of a set of numerical elements.

BACKGROUND OF THE INVENTION

Various applications may call for the calculation of the elementary symmetric functions of subsets of a set of numerical elements. For a set $\{Z\}$ comprising m numerical elements, the jth elementary symmetric function of set $\{Z\}$ is the sum of the products of all subsets of j distinct elements of set $\{Z\}$. In this regard, esf(j) denotes the jth elementary symmetric function of set $\{Z\}$ indexed by number j. By way of example, for a set $\{Z\}$ containing m=5 numerical elements (e.g. $\{Z\}=\{a, b, c, d, e\}$), the esf(j)'s are:

$esf(0)=1$ $esf(1)=a+b+c+d+e$ $esf(2)=ab+ac+ad+ae+bc+bd+be+cd+ce+de$ $esf(3)=abc+abd+abe+acd+ace+ade+bcd+bce+bde+cde$ $esf(4)=abcd+abce+abde+acde+bcde$ $esf(5)=abcde$ When called for, the elementary symmetric functions of a (m−1)-subset of a set $\{Z\}$ may be calculated by removing one of the elements of set $\{Z\}$ and then calculating the elementary symmetric functions of the subset in the same manner as for the entire set $\{Z\}$. In this regard, one known manner of implementing such a process may be expressed in pseudo-code as follows:

```
for i= 1 to m
{
    subset = {Z\z(i)}
    ssf (:, i) = calculateESF(subset)
}
``` where $\{Z\backslash z(i)\}$ is the subset of set $\{Z\}$ with the ith element of set $\{Z\}$ removed. As can be seen, such a process makes m calls to the relatively expensive (in terms of calculation time) calculateESF( ) function (e.g., the poly( ) function in MATLAB®), which is the function that calculates the elementary symmetric functions. In accordance with such a process that makes m calls to the function that calculates the elementary symmetric functions, calculation of the elementary symmetric functions for all (m−1)-subsets of set $\{Z\}$ requires a $m^{2}*(\log m)^2$ time-frame in order to complete since one of the fastest known algorithms for calculating one set of elementary symmetric functions requires a $m*(\log m)^2$ time frame to complete.

SUMMARY OF THE INVENTION

Accordingly, the present invention provides a method and system that simplify and increase the speed of calculating elementary symmetric functions of all (m−1)-subsets of a set $\{Z\}$ of numerical elements. In this regard, the (m−1)-subsets of set $\{Z\}$ include each possible subset of set $\{Z\}$ in which one of the elements of set $\{Z\}$ has been removed and the elementary symmetric functions of the (m−1)-subsets of a set $\{Z\}$ may be referred to herein as secondary symmetric functions. The method and system of the present invention may be employed in various environments including, for example, when secondary symmetric function calculation is called for by a Cardinalized Probability Hypothesis Density (CPHD) multi-target tracker. One advantage of the method and system of the present invention is that they recursively calculate the secondary symmetric functions. Employing recursive calculation in calculating the secondary symmetric functions accomplishes the calculations in an $m^2$ time-frame, where m is the number of elements in set $\{Z\}$.

In one aspect, a method of calculating secondary symmetric functions comprises the steps of: receiving a set $\{Z\}$ comprising a total of m numerical elements, wherein $z(i)$ denotes the ith element of set $\{Z\}$ indexed by number i; obtaining a plurality of elementary symmetric functions for set $\{Z\}$, wherein esf(j) denotes the jth elementary symmetric function of set $\{Z\}$ indexed by number j; and determining a plurality of secondary symmetric functions for set $\{Z\}$, wherein for each value of index i, ssf(j,i) denotes the jth elementary symmetric function of the subset $\{Z\backslash z(i)\}$ comprising set $\{Z\}$ with element $z(i)$ removed from set $\{Z\}$, and wherein for a particular value of index i, the secondary symmetric functions are determined in accordance with a recursive relationship among the secondary symmetric function to be determined, a previously determined secondary symmetric function, one of the obtained elementary symmetric functions, and the element $z(i)$ removed from set $\{Z\}$. In determining the secondary symmetric functions for set $\{Z\}$ in accordance with the recursive relationship, upward iteration through index j, downward iteration through index j, or a combination of upward and downward iteration through index j may be used. In one embodiment, the set $\{Z\}$ comprises m positive real numerical elements that each represent a likelihood that a detection from a signal sensor is associated with a target divided by a likelihood of such detection being noise or clutter, and the secondary symmetric functions for set $\{Z\}$ are calculated as part of a CPHD multi-target tracking process.

In another aspect, a system that calculates secondary symmetric functions comprises memory, a processing device, and computer program instructions. The memory stores a set $\{Z\}$ comprising a total of m numerical elements, wherein $z(i)$ denotes the ith element of set $\{Z\}$ indexed by number i. The processing device is communicatively coupled with the memory for receiving the set $\{Z\}$ from the memory as needed. The computer program instructions which may be stored on a computer readable medium are executable by the processing device. When executed, the computer program instructions enable the processing device to: receive the set $\{Z\}$ from memory; obtain a plurality of elementary symmetric functions for set $\{Z\}$, wherein esf(j) denotes the jth elementary symmetric function of set $\{Z\}$ indexed by number j; determine a plurality of secondary symmetric functions for set $\{Z\}$, wherein for each value of index i, ssf(j,i) denotes the jth elementary symmetric function of a subset $\{Z\backslash z(i)\}$ comprising set $\{Z\}$ with element $z(i)$ removed from set $\{Z\}$, and wherein for a particular value of index i, the secondary symmetric functions are determined in accordance with a recursive relationship among the secondary symmetric function to be determined, a previously determined secondary symmetric function, one of the obtained elementary symmetric functions, and the element z(i) removed from set {Z}; and output the plurality of secondary symmetric functions. The processor may determine the secondary symmetric functions for set {Z} in accordance with a recursive relationship using upward iteration through index j, downward iteration through index j, or a combination of upward and downward iteration through index j. In one embodiment, the set {Z} comprises m positive real numerical elements that each represent a likelihood that a detection from a signal sensor is associated with a target divided by a likelihood of such detection being noise or clutter, and the secondary symmetric functions for set {Z} are output to a CPHD multi-target tracker.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
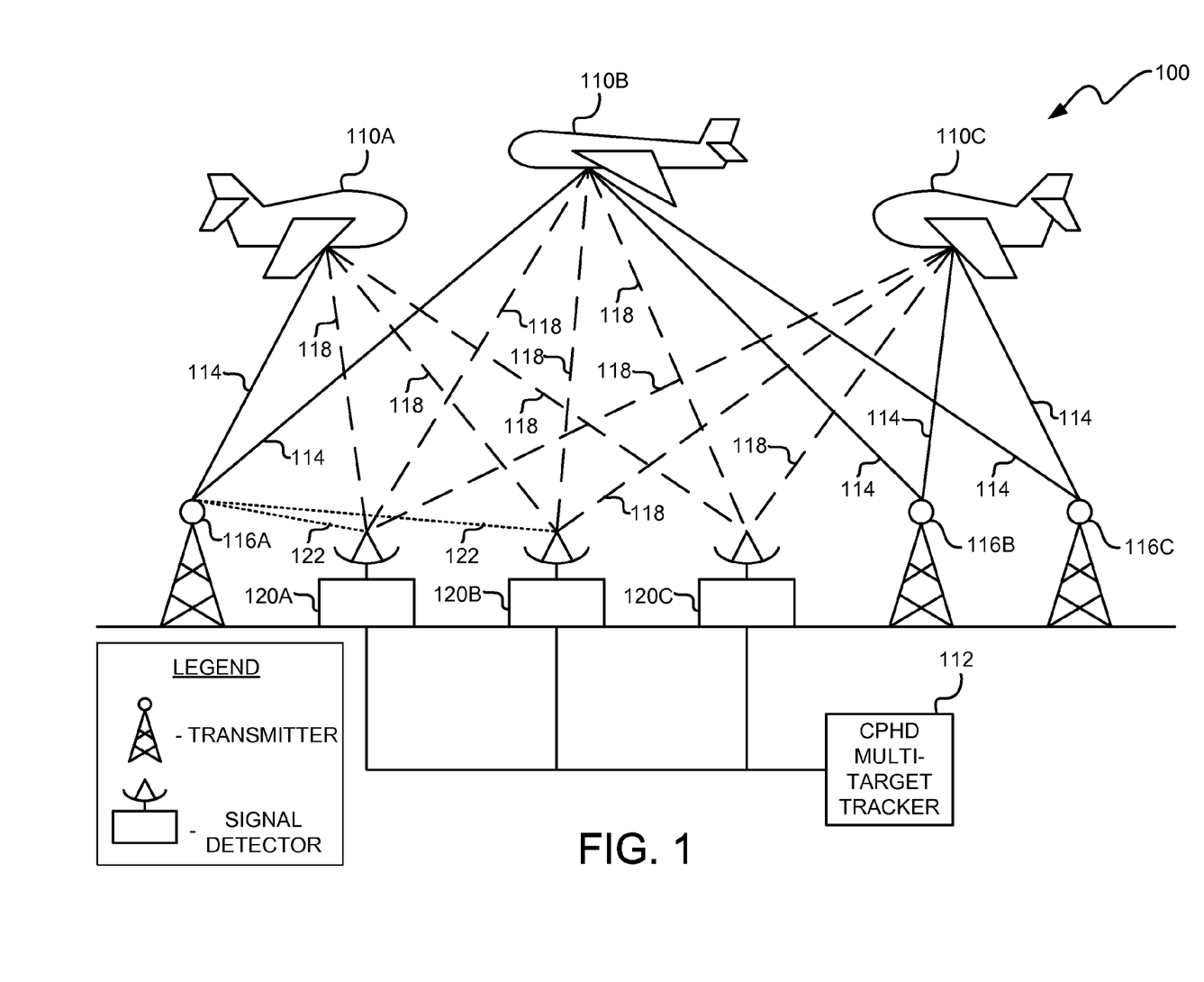
FIG. 1 illustrates an exemplary CPHD tracking environment in which calculation of secondary symmetric functions in accordance with the present invention may be employed.

FIG. 1 provides an overview of one exemplary environment in which calculation of secondary symmetric functions may be employed. In this regard, the calculation of secondary symmetric functions may be employed within a CPHD tracking environment 100 wherein the position of one or more target objects 110A-110C are tracked using a CPHD multi-target tracker 112. The environment 100 depicted in FIG. 1 is not the only instance in which calculation of secondary symmetric functions may be employed, and the calculation of secondary symmetric functions may be useful in other environments.

In the CPHD tracking environment 100 of FIG. 1, signals 114 are transmitted from one or more transmitters 116A-116C and reflected from the one or more target objects 110A-110C thereby producing one or more target reflected signals 118. One or more of the target reflected signals 118 may be received by one or more signal detectors 120A-120C. The transmitters 116A-116C may be controlled transmitters (e.g., radar transmitters) that are controlled by an operator of the signal detectors 120A-120C, may be uncontrolled transmitters (e.g. television transmitters, radio transmitters, cellular transmitters), or a combination of controlled and uncontrolled transmitters. One or more of the transmitters 116A-116C may be located at location(s) that differ from the location(s) of the signal detectors 120A-120C. In this regard, the signal detectors 120A-120C may also receive direct signals 122 on a direct path from the transmitters 116A-116C without being reflected from a target object 110A-110C.

As the target reflected signals 118 and the direct signals 122, if any, are received over time by the signal detectors 120A-120C, they are processed to generate successive sets of measurements. The sets of measurements are provided to the CPHD multi-target tracker 112. The CPHD multi-target tracker 112 uses each set of new measurements to update an estimated state (e.g. location, velocity) of the swarm of target objects 110A-110C. For each new measurement, the CPHD multi-target tracker 112 may calculate the probability that the particular measurement is a real detection of one of the target objects 110A-110C in the swarm Z={a, b, c, d, e}, where a, b, c, d, and e are positive real numerical elements that each represent a likelihood (probability) that a detection from a signal sensor is associated with a target divided by a likelihood (probability) of such detection being noise or clutter. CPHD considers all possibilities of which measurements are real detections and which are detector noise. In this regard, the product of likelihoods of, for example, three measurements is related to the likelihood that those three (and no others) are real detections. By way of example, the third elementary symmetric function is related to the probability that exactly any three measurements are real.

Figure 2:
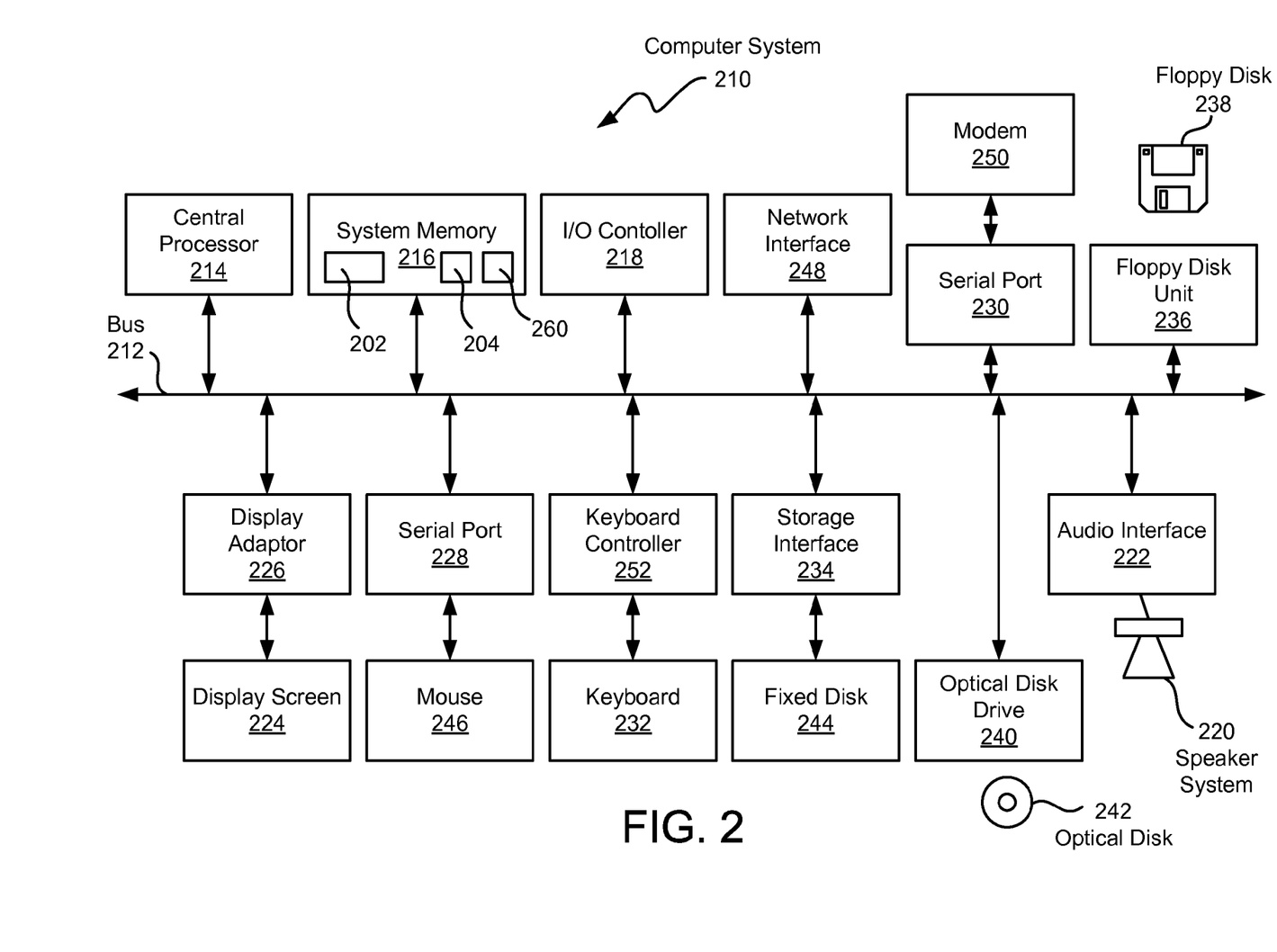
FIG. 2 is a block diagram showing one embodiment of a computer implemented CPHD multi-target tracker having a secondary symmetric function calculation module implemented therewith.

FIG. 2 shows one embodiment of CPHD multi-target tracker 112 having a module 202 that calculates secondary symmetric functions implemented therewith. The CPHD multi-target tracker 112 may comprise a computer system 210. Computer system 210 may include a number of components such as a system bus 212 that interconnects major subsystems of the computer system 210 such as a central processor 214, a system memory 216 (e.g., RAM, ROM, flash RAM, and the like), an input/output controller 218, an external audio device such as a speaker system 220 via an audio output interface 222, an external device such as a display screen 224 via display adapter 226, serial ports 228 and 230, a keyboard 232 (interfaced with a keyboard controller 252), a storage interface 234 providing an interface to a fixed disk 244, a floppy disk drive 236 operative to receive a floppy disk 238, and an optical disk drive 240 operative to receive an optical disk 242 (e.g. a DVD or CD-ROM) disk. Fixed disk drive 244 may be a part of computer system 210 as shown or may be separate and accessed through other interface systems. Also included are a mouse 246 (or other point-and-click device) coupled to bus 212 via serial port 228, a network interface 248 (coupled directly to bus 212), and a modem 250 (coupled to bus 212 via serial port 230). Network interface 248 may provide a direct connection to a remote server via a direct network link to the Internet via a POP (point of presence). Network interface 248 may also provide such connection using wireless techniques, including digital cellular telephone connection, Cellular Digital Packet Data (CDPD) connection, digital satellite data connection, Wi-Fi or the like. Modem 250 may provide a direct connection to a remote server via a telephone link or to the Internet via an internet service provider (ISP).

Bus 212 allows data communication between central processor 214 and system memory 216, which may include both read only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output System (BIOS) which controls basic hardware operation such as the interaction with peripheral components. Applications resident with computer system 210 are generally stored on and accessed via a computer readable medium, such as a hard disk drive (e.g., fixed disk 244), optical drive 240, floppy disk unit 236 or other storage medium. Additionally, applications may be in the form of electronic signals modulated in accordance with the application and data communication technology when accessed via network modem 250 or interface 248.

The CPHD multi-target tracker 112 and secondary symmetric function calculation module 202 employed therewith may be implemented by software modules that perform certain tasks. In this regard, the CPHD multi-target tracker 112 module and secondary symmetric function calculation module 202 employed therewith may be loaded in to memory 216 for execution by central processor 214 from the fixed disk 244, the optical disk 242 (via optical disk drive 240), the floppy disk 238 (via floppy disk unit 236) and/or from a separate server computer (not shown) via network interface 248 or modem 250. The measurements 260 to be processed by the CPHD multi-target tracker 112 and secondary symmetric function calculation module 202 may be received by computer system 210 in a variety of manners including, for example, via network interface 248, via modem 250, via another port (not shown) coupled to bus 212, via floppy disk 238, and/or via optical disk 242. When received, the measurements 260 may be stored in memory 216, on fixed disk 244, on floppy disk 238, and/or on optical disk 242 and provided to central processor 214 via system bus 212 when needed during execution of the CPHD multi-target tracker module 112 and secondary symmetric function calculation module 202.

Many other devices or subsystems (not shown) may be connected in a similar manner (e.g., bar code readers, document scanners, digital cameras and so on). Conversely, it is not necessary for all of the devices shown in FIG. 2 to implement a CPHD multi-target tracker 112. The devices and subsystems may be interconnected in different ways from that shown in FIG. 2. The operation of a computer system 210 such as that shown in FIG. 2 is readily known in the art and is not discussed in detail in this application. Computer program software code 204 to implement the CPHD multi-target tracker 112 and secondary symmetric function calculation module 202 employed therewith may be stored in computer-readable storage media such as one or more of system memory 216, fixed disk 244, optical disk 242, or floppy disk 238. Additionally, computer system 210 may be any kind of computing device, and so includes personal data assistants (PDAs), network appliances, X-window terminals or other such computing devices. The operating system provided on computer system 210 may be MS-DOS®, MS-WINDOWS®, OS/2®, UNIX®, LINUX®, and the like. Computer system 210 also supports a number of Internet access tools, including, for example, an HTTP-compliant web browser having a JavaScript interpreter, such as NETSCAPE NAVIGATOR®, MICROSOFT EXPLORER®, MOZILLA FIREFOX® and the like.

The CPHD multi-target tracker 112 and secondary symmetric function calculation module 202 employed therewith have been described in the context of a fully functional computer system 210. However, the CPHD multi-target tracker module 112 and secondary symmetric function calculation module 202 are each capable of being distributed as a program product in a variety of forms, and may function regardless of the particular type of signal bearing media used to actually carry out the distribution. Examples of signal bearing media include recordable media such as floppy disks and DVD/CD-ROM, transmission type media such as digital and analog communications links (e.g. the Internet), as well as media storage and distribution systems developed in the future. Further, some or all functional aspects of the CPHD multi-target tracker module 112 and secondary symmetric function calculation module 202 employed therewith may be implemented in the form of hardware components (e.g. a VLSI chip) and/or programmable logic (e.g. an FPGA chip). Additionally, although the CPHD multi-target tracker module 112 and secondary symmetric function calculation module 202 are depicted in FIG. 2 as separate modules loaded into system memory 216, it is possible for secondary symmetric function calculation module 202 to be part of the CPHD multi-target tracker module 112. Also, in other embodiments in which the secondary symmetric function calculation module 202 is employed in environments different from the CPHD multi-target tracking environment 100 of FIG. 1, the secondary symmetric function calculation module 202 may still be a software module executed by a computer system 210 such as shown in FIG. 2.

The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as DVD/CD-ROMs or DVD/CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Figure 3:
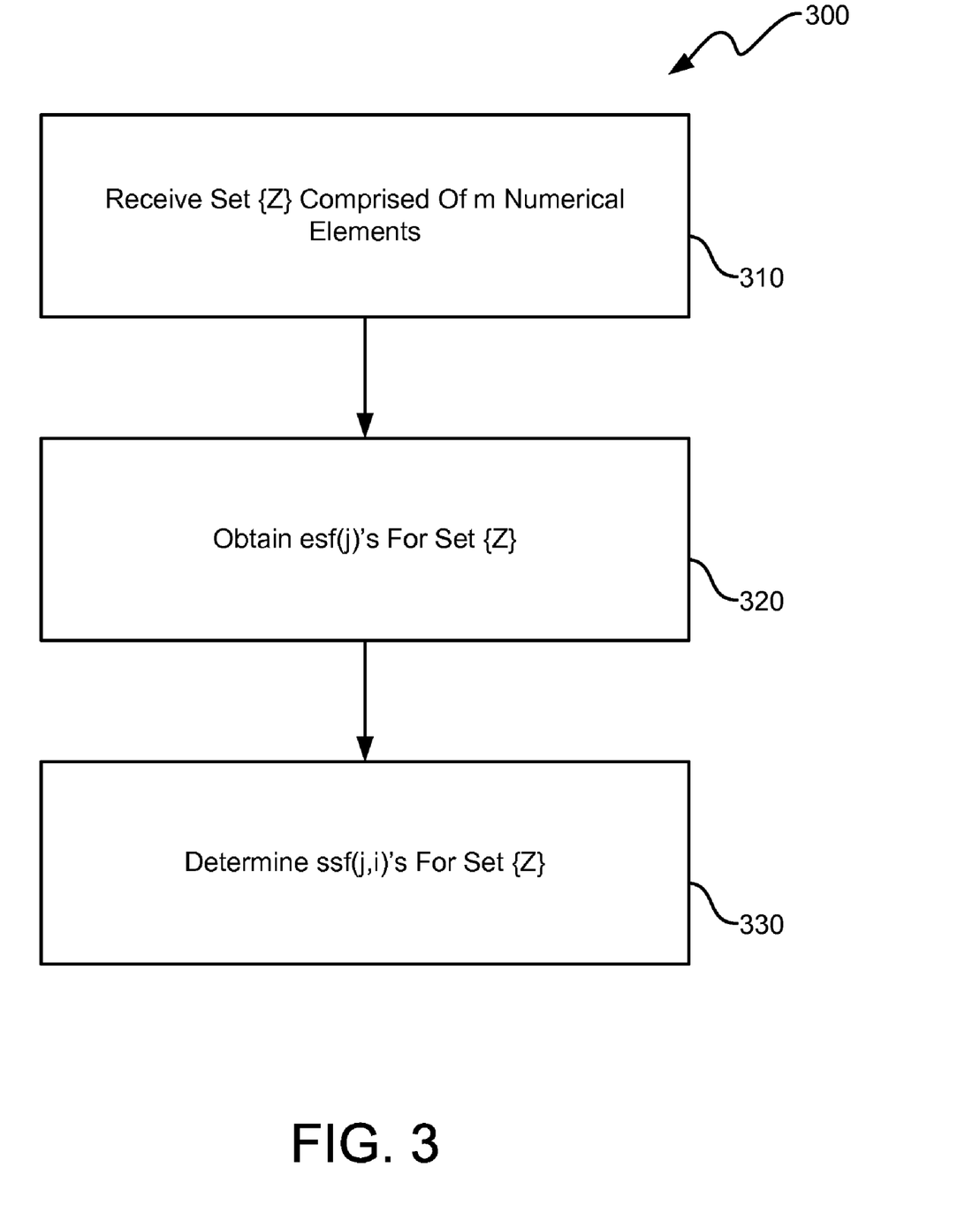
FIG. 3 shows one embodiment of a method of calculating secondary symmetric functions in accordance with the present invention.

FIG. 3 shows one embodiment of a method 300 of calculating secondary symmetric functions. The method of FIG. 3 may, for example, be implemented within a CPHD multi-target tracker 112 such as described in connection with FIG. 2. In this regard, the method 300 shown in FIG. 3 may, for example, be implemented in computer program software code that is executable by the processor 214 of computer system 210 used to implement the CPHD multi-target tracker 112.

In step 310 of the method 300, a set $\{Z\}$ comprising a total of m numerical elements is received. In embodiments where the method is implemented in a CPHD multi-target tracker 112, m may be the number of sensors reporting target reflected signals and set $\{Z\}$ may be comprised of m real, positive numerical elements that represent, for example, probabilities associated with the detections from signal detectors in a CPHD multi-target tracking environment. In this regard, $z(i)$ denotes the ith element of set $\{Z\}$ indexed by number i.

In step 320, a plurality of elementary symmetric functions for set $\{Z\}$ is obtained. Where the method 300 is implemented in software program code, the esf(j)'s for set $\{Z\}$ may be obtained by calling a public domain function such as, for example, the poly( ) function available from MATLAB®.

In step 330, a plurality of secondary symmetric functions for set $\{Z\}$ is determined. In this regard, for each value of index i, ssf(j,i) denotes the jth elementary symmetric function of a subset $\{Z\backslash z(i)\}$ comprising set $\{Z\}$ with element z(i) removed from set $\{Z\}$. Rather than employing the public domain approach of calculating the ssf(j,i)'s which makes repeated calls to the expensive calculateESF( ) function, in step 330, for each particular value of index i, the secondary symmetric functions ssf(j,i)'s are determined in accordance with a recursive relationship among the secondary symmetric function to be determined, a previously determined secondary symmetric function, one of the obtained elementary symmetric functions, and the element z(i) removed from set $\{Z\}$. The determination of the secondary symmetric functions ssf(j,i)'s in accordance with the recursive relationship may proceed in several different manners as depicted in FIGS. 4-6B.

Figure 4:
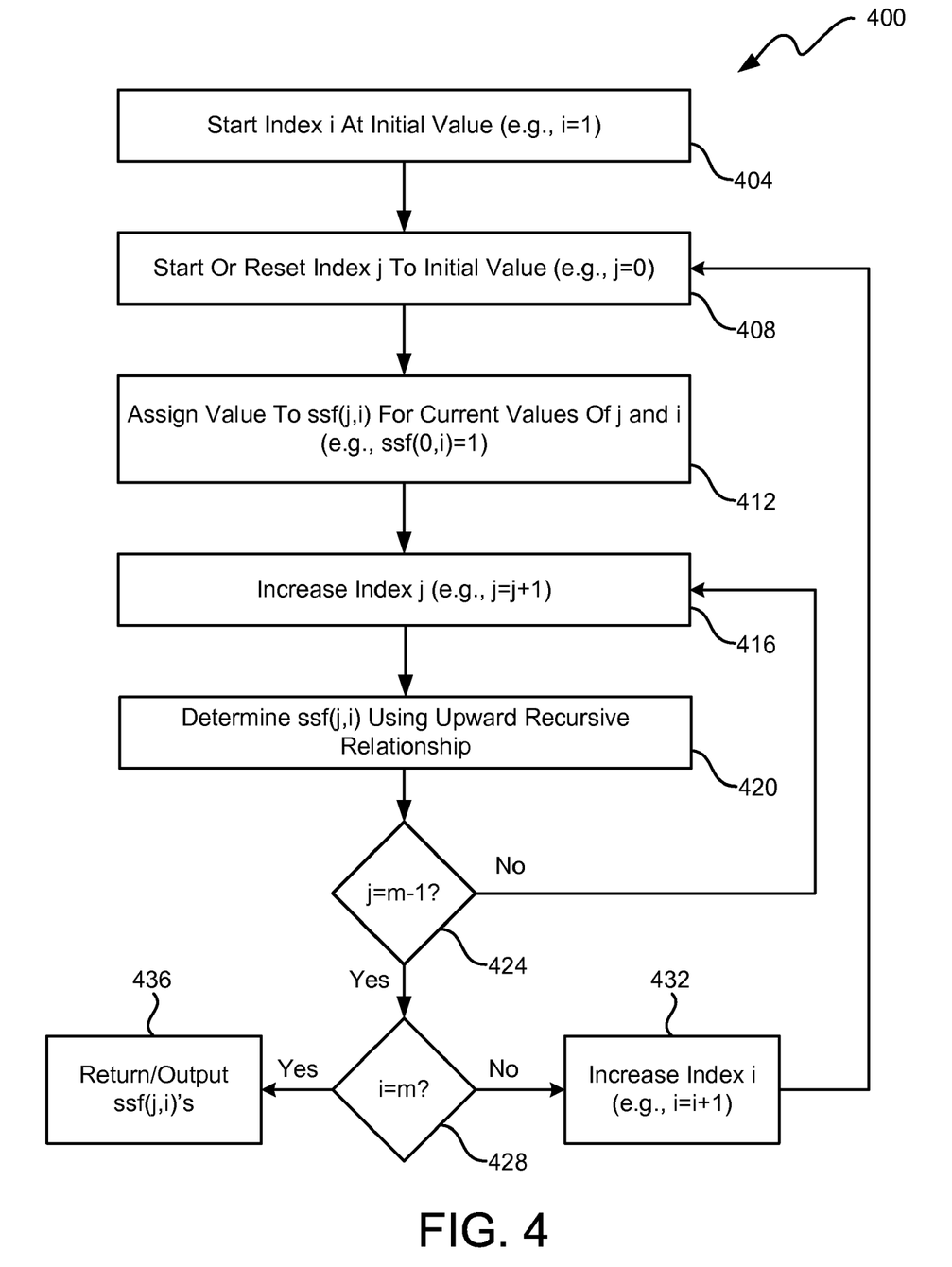
FIG. 4 shows one embodiment of an upward iterative process that may be included in the method of FIG. 3 to determine the secondary symmetric functions.

FIG. 4 shows one embodiment of the steps of a process 400 that may comprise step 330 wherein the secondary symmetric functions ssf(j,i)'s are determined in accordance with a recursive relationship in which index j is iterated in an upward manner. In step 404, index i is started at an initial value (e.g. i=1). In step 408, index j is started or reset to an initial value (e.g. j=0). In step 412, a value is assigned to the secondary symmetric function for the current value of index j and the current value of index i (e.g. ssf(0,i)=1). In step 416, index j is increased from its current value (e.g. j=j+1). In step 420, the secondary symmetric function for the current values of indexes i and j are determined using a relationship between the elementary symmetric function esf(j) for the current value of index j, the ith element z(i) of set $\{Z\}$, and the determined (or assigned) value of the secondary symmetric function for the previous value of index j and the current value of index i. One manner of expressing such relationship is:

$$ssf(j,i)=esf(j)-z(i)*ssf(j-1,i)$$

In step 424, a determination is made as to whether the current value of index j equals one fewer than the number m of elements in set $\{Z\}$ as (m−1) is the index of the last secondary symmetric function there is to calculate for a given value of index i. If not, the process 400 returns to step 416, and if so, the process 400 proceeds with step 428. In step 428, a determination is made as to whether index i equals the number m of elements in set $\{Z\}$. If not, the process 400 proceeds with step 432, and if so the process proceeds to step 436. In step 432, the current value of index i is increased (e.g. i=i+1), and thereafter the process 400 returns to step 408. In step 436, the array of secondary symmetric function values for the range of indexes i and j (the ssf(j,i)'s) is returned or output to the function or process that called for the determination of the secondary symmetric functions (e.g. to the function or process of the CPHD multi-target tracker that called for the calculation of the secondary symmetric functions of set $\{Z\}$).

Figure 5:
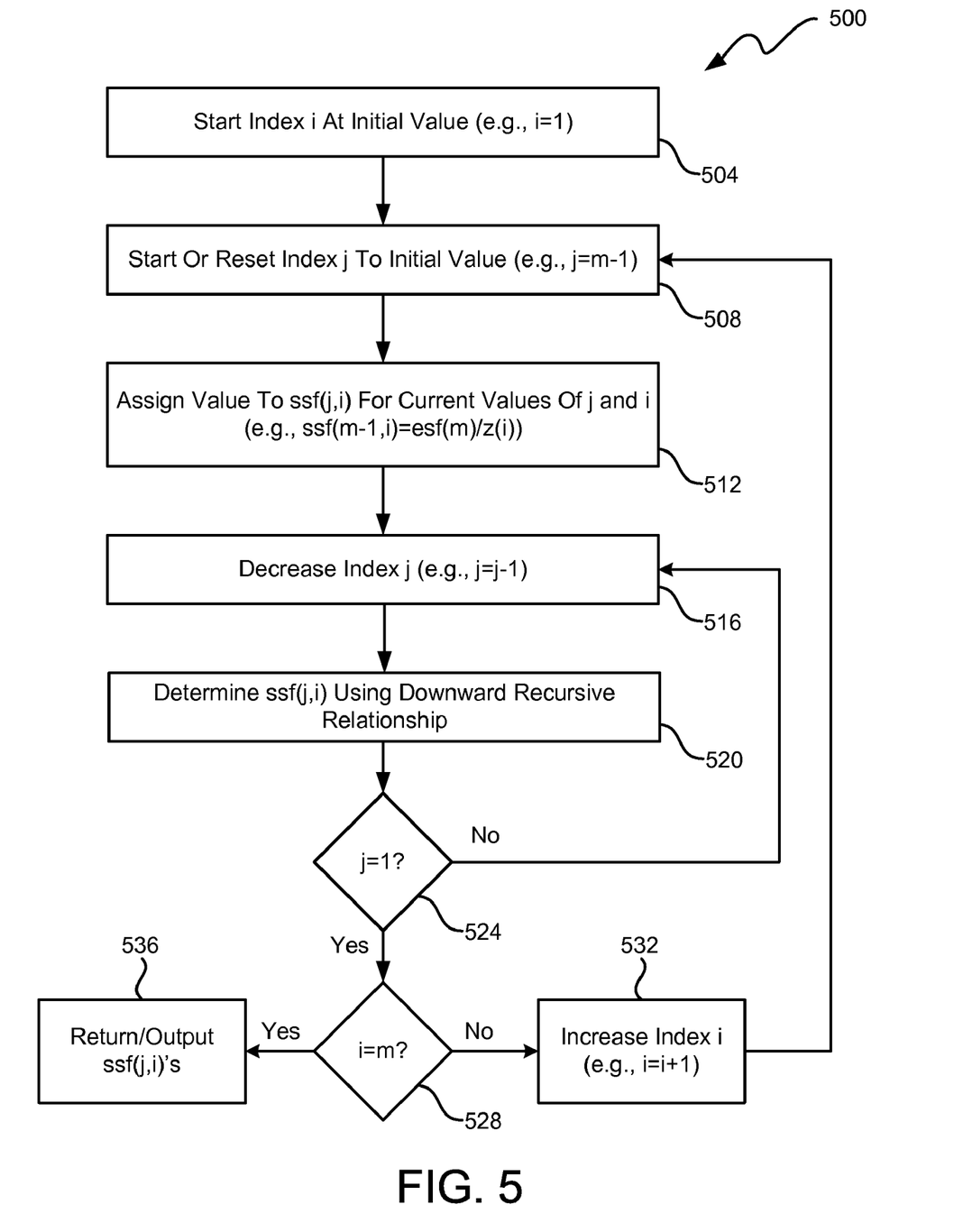
FIG. 5 shows one embodiment of an downward iterative process that may be included in the method of FIG. 3 to determine the secondary symmetric functions.

FIG. 5 shows one embodiment of the steps of a process 500 that may comprise step 330 wherein the secondary symmetric functions ssf(j,i)'s are determined in accordance with a recursive relationship in which index j is iterated in a downward manner. In step 504, index i is started at an initial value (e.g. i=1). In step 508, index j is started or reset to an initial value based on the number of elements m in set $\{Z\}$ (e.g. j=m−1). In step 512, a value is assigned to the secondary symmetric function for the current value of index j and the current value of index i based on the elementary symmetric function for index i=m and ith element of set $\{Z\}$ (e.g. ssf(m'11,i)=esf(m)/z(i)). In step 516, index j is decreased from its current value (e.g. j=j−1). In step 520, the secondary symmetric function for the current values of indexes i and j are determined using a relationship between the elementary symmetric function esf(j) for the previous value of index j, the ith element z(i) of set $\{Z\}$, and the determined (or assigned) value of the secondary symmetric function for the previous value of index j and the current value of index i. One manner of expressing such relationship is:

$$ssf(j,i)=(esf(j+1)-ssf(j+1,i))/z(i)$$

In step 524, a determination is made as to whether the current value of index j equals one. If not, the process 500 returns to step 516, and if so, the process 500 proceeds with step 528. In step 528, a determination is made as to whether index i equals the number m of elements in set $\{Z\}$. If not, the process 500 proceeds with step 532, and if so the process proceeds to step 536. In step 532, the current value of index i is increased (e.g. i=i+1), and thereafter the process 500 returns to step 508. In step 536, the array of secondary symmetric function values for the range of indexes i and j (the ssf(j,i)'s) is returned or output to the function or process that called for the determination of the secondary symmetric functions (e.g. to the function or process of the CPHD multi-target tracker that called for the calculation of the secondary symmetric functions of set $\{Z\}$).

Due to the finite precision of digital computers, the upward recursion process illustrated in FIG. 4 can become unstable when ssf(j,i) is less than esf(j)/2. Similarly, the downward iteration process illustrated in FIG. 5 can become unstable when ssf(j,i) is greater than esf(j)/2. One manner of addressing such potential instability is to combine the upward and downward iteration processes of FIG. 4 and FIG. 5. One such manner of doing so is illustrated in FIGS. 6A-6B.

Figure 6A:
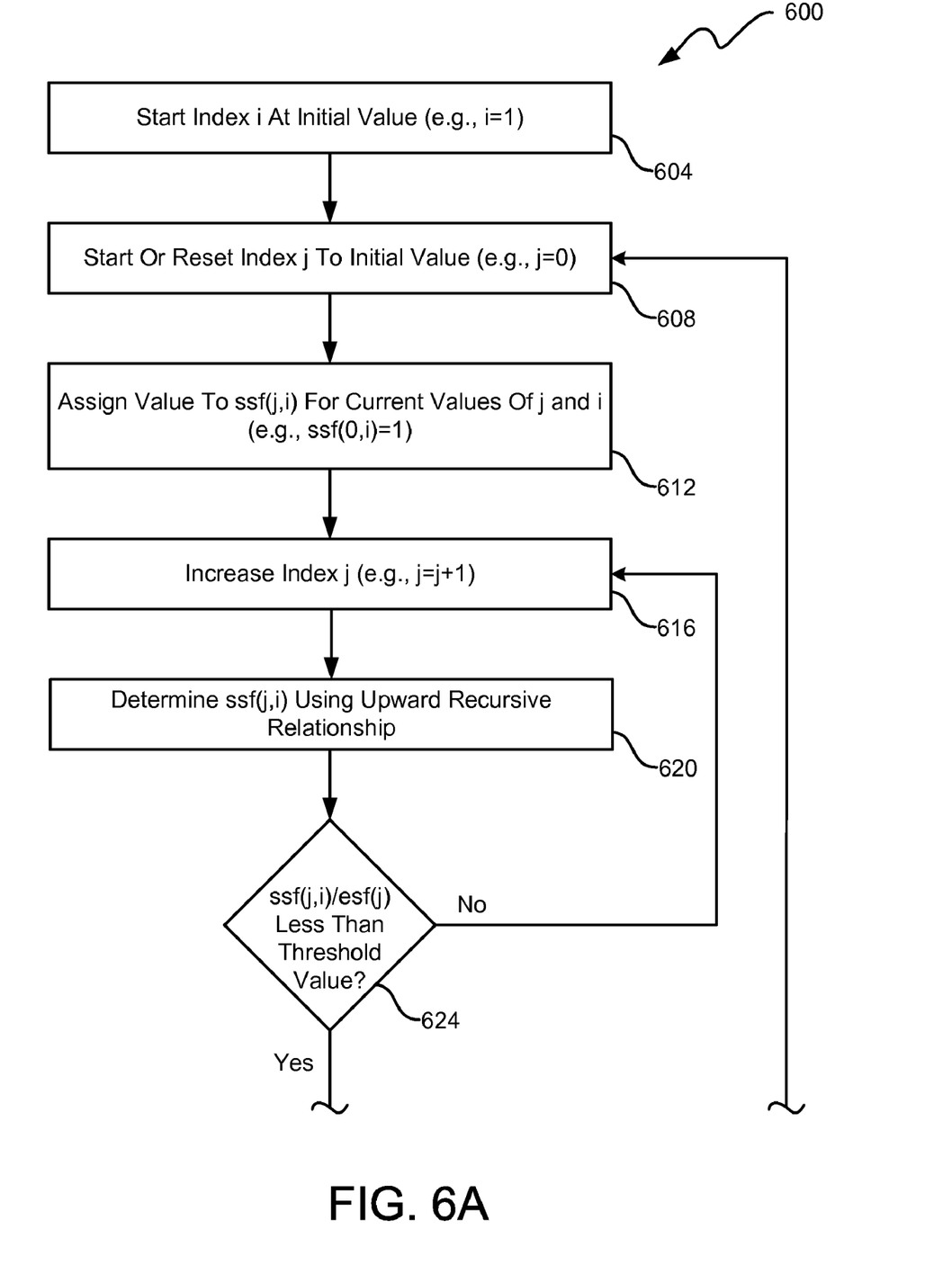
FIGS. 6A-6B show one embodiment of a combined upward and downward iterative process that may be included in the method of FIG. 3 to determine the secondary symmetric functions.
Figure 6B:
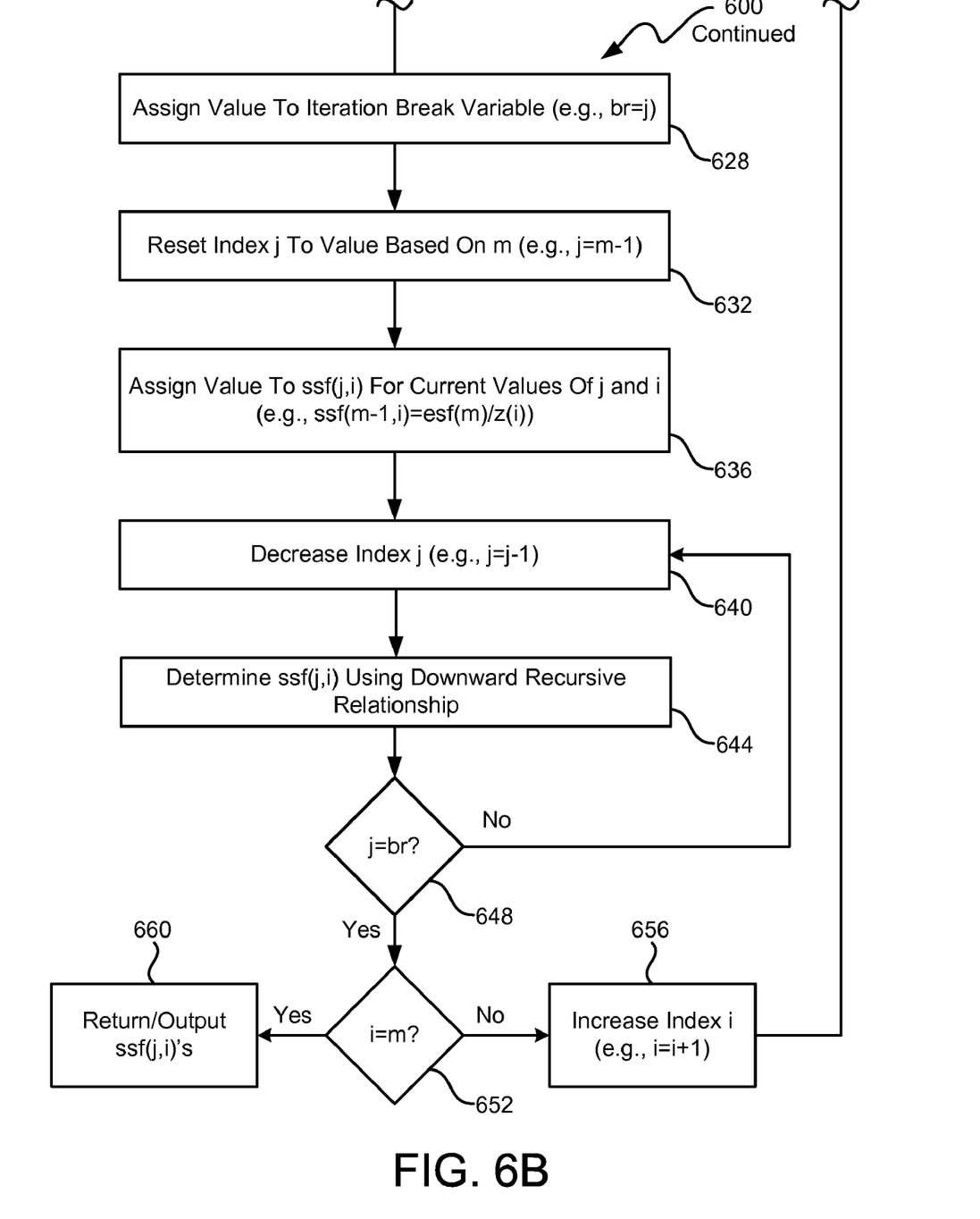

FIGS. 6A-6B show one embodiment of the steps of a process 600 that may comprise step 330 wherein the secondary symmetric functions ssf(j,i)'s are determined in accordance with a recursive relationship in which index j is iterated in an upward manner while a ratio of ssf(j,i) and esf(j) is below a threshold value, and the secondary symmetric functions ssf(j,i)'s are determined in accordance with a recursive relationship in which index j is iterated in a downward manner while a ratio of ssf(j,i) and esf(j) is above the threshold value. Although the steps of process 600 call for upward iteration through index j and then downward iteration through index j for each value of index i, in other embodiments the order of the iteration may be reversed (e.g., downward through index j and then upward through index j) or the upward and downward iterations may be done in a parallel convergent manner.

In step 604, index i is started at an initial value (e.g. i=1). In step 608, index j is started or reset to an initial value (e.g. j=0). In step 612, a value is assigned to the secondary symmetric function for the current value of index j and the current value of index i (e.g. ssf(0,i)=1). In step 616, index j is increased from its current value (e.g. j=j+1). In step 620, the secondary symmetric function for the current values of indexes i and j are determined using a relationship between the elementary symmetric function esf(j) for the current value of index j, the ith element z(i) of set $\{Z\}$, and the determined (or assigned) value of the secondary symmetric function for the previous value of index j and the current value of index i. One manner of expressing such relationship is:

$$ssf(j,i)=esf(j)-z(i)*ssf(j-1,i)$$

In step 624, a determination is made as to whether the ratio of ssf(j,i) divided by esf(j) is below a threshold value (e.g. ssf(j,i)/esf(j)<0.5). If not, the process 600 returns to step 616, and if so, the process 600 proceeds with step 628. In step 628, an iteration break variable is assigned a value corresponding to the current value of index j (e.g. br=j) and the upward iteration of index j is concluded.

After step 628, the process 600 begins downward iteration of index j proceeds with step 632. In step 632, index j is reset to a value based on the number of elements m in set {Z} (e.g. j=m−1). In step 636, a value is assigned to the secondary symmetric function for the current value of index j and the current value of index i based on the elementary symmetric function for index i=m and ith element of set {Z} (e.g. ssf(m−1,i)=esf(m)/z(i)). In step 640, index j is decreased from its current value (e.g. j=j−1). In step 644, the secondary symmetric function for the current values of indexes i and j are determined using a relationship between the elementary symmetric function esf(j) for the previous value of index j, the ith element z(i) of set {Z}, and the determined (or assigned) value of the secondary symmetric function for the previous value of index j and the current value of index i. One manner of expressing such relationship is:

$$ssf(j,i)=(esf(j+1)-ssf(j+1,i))/z(i)$$

In step 648, a determination is made as to whether the current value of index j equals the value of the iteration break variable (e.g. j=br). If not, the process 600 returns to step 640, and if so, the process 600 proceeds with step 652. In step 652, a determination is made as to whether index i equals the number m of elements in set {Z}. If not, the process 600 proceeds with step 656, and if so the process proceeds to step 660. In step 656, the current value of index i is increased (e.g. i=i+1), and thereafter the process 600 returns to step 608. In step 660, the array of secondary symmetric function values for the range of indexes i and j (the ssf(j,i)'s) is returned or output to the function or process that called for the determination of the secondary symmetric functions (e.g. to the function or process of the CPHD multi-target tracker that called for the calculation of the secondary symmetric functions of set {Z}).

It is possible to implement the processes of FIGS. 4-6B in computer software program code executable by a computer processor. By way of example, one manner of implementing the steps of FIGS. 6A-6B (expressed in pseudo-code) follows:

```
% Assume the esf( ) array is already populated.
% populate just the ssf( ) array.
for i = 1 to m
{
    % Iterate upward until the instability condition is reached.
    br = m;
    ssf(0,i) = 1;
    for j = 1 to m−1
    {
        ssf(j,i) = esf(j) − z(i) * ssf(j−1,i);
        if( ssf(j,i) / esf(j) < .5 )
        {
            br = j;
            break;
        }
    }
    % Complete the table using downward iteration.
    ssf(m−1,i) = esf(m) / z(i);
    for j = m−2 to br step −1
    {
        ssf(j,i) = ( esf(j+1) − ssf(j+1,i) ) / z(i);
    }
}
```

The processes of FIGS. 4-6B may of course be implemented in computer software program code in other manners.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method of updating estimated locations and velocities for a swarm of target objects within a Cardinalized Probability Hypothesis Density (CPHD) multi-target tracker environment including a plurality of signal detectors, said method comprising the steps of:
    detecting a plurality of signals with the plurality of signal detectors, the plurality of signals including target reflected signals comprising signals transmitted from one or more transmitters and reflected from the target objects;
    processing the detected signals with a processing device communicatively coupled with the signal detectors to generate a set {Z} comprising a total of m positive real numerical elements, each element of set {Z} representing a likelihood that a signal detected by one of the signal detectors is associated with a target object divided by a likelihood of such detected signal being noise or clutter, wherein z(i) denotes the ith element of set {Z} indexed by number i;
    obtaining a plurality of elementary symmetric functions for set {Z}, wherein esf(j) denotes the jth elementary symmetric function of set {Z} indexed by number j;
    determining a plurality of secondary symmetric functions for set {Z}, wherein for each value of index i, ssf(j,i) denotes the jth elementary symmetric function of a subset {Z\z(i)} comprising set {Z} with element z(i) removed from set {Z}, and wherein for a particular value of index i, the secondary symmetric functions are determined in accordance with a recursive relationship among the secondary symmetric function to be determined, a previously determined secondary symmetric function, one of the obtained elementary symmetric functions, and the element z(i) removed from set {Z}; and
    outputting the plurality of secondary symmetric functions for set {Z}.

2. The method of claim 1 wherein said step of calculating comprises:
    recursively calculating ssf(j,i) in accordance with the following relationship:

$$ssf(j, i)=esf(j)-z(i)*ssf(j-1,i)$$

while iterating index i upward to the value m and, for each value of index i, iterating index j upward to the value m−1.

3. The method of claim 2 further comprising:
    assigning ssf(0, i) a fixed value for each value of index i prior to iterating index j upward and recursively calculating ssf(j,i).

4. The method of claim 3 wherein ssf(0, i) is assigned a value of 1.

5. The method of claim 1 wherein said step of calculating comprises:
    recursively calculating ssf(j, i) in accordance with the following relationship:

$$ssf(j, i)=(esf(j+1)-ssf(j+1,i))/z(i)$$

while iterating index i upward to the value m and, for each value of index i, iterating index j downward from the value m−2.

6. The method of claim 5 further comprising:
    assigning ssf(m−1, i) a fixed value for each value of index i prior to iterating index j downward and recursively calculating ssf(j,i).

7. The method of claim 6 wherein ssf(m−1, i) is assigned a value in accordance with the expression:

$$ssf(m-1, i)=esf(m)/z(i).$$

8. The method of claim 1 wherein said step of calculating comprises:
   recursively calculating ssf(j,i) in accordance with the following relationship:

$$ssf(j, i)=esf(j)-z(i)*ssf(j-1, i)$$

while iterating index i upward to the value m and, for each value of index i, iterating index j upward until an instability condition is reached; and
   recursively calculating ssf(j,i) in accordance with the following relationship:

$$ssf(j, i)=(esf(j+1)-ssf(j+1, i))/z(i)$$

while iterating index i upward to the value m and, for each value of index i, iterating index j downward from the value m−2 until the instability condition is reached.

9. The method of claim 8 further comprising:
   determining whether the instability condition is reached by evaluating whether ssf(j,i) divided by esf(j) is less than or greater than a threshold value c.

10. The method of claim 9 wherein the threshold value c=0.5.

11. The method of claim 9 further comprising:
   assigning ssf(0,i) a fixed value for each value of index i prior to iterating index j upward and recursively calculating ssf(j,i); and
   assigning ssf(m−1,i) a fixed value for each value of index i prior to iterating index j downward and recursively calculating ssf(j,i).

12. The method of claim 11 wherein ssf(0,i) is assigned a value of 1, and wherein ssf(m−1,i) is assigned a value in accordance with the expression:

$$ssf(m-1, i)=esf(m)/z(i).$$

13. A Cardinalized Probability Hypothesis Density (CPHD) multi-target tracker system that updates estimated locations and velocities for a swarm of target objects, said system comprising:
   a plurality of signal detectors detecting a plurality of signals including target reflected signals comprising signals transmitted from one or more transmitters and reflected from the target objects;
   a processing device communicatively coupled with said signal detectors that processes the detected signals to generate a set {Z} comprising a total of m positive real numerical elements, each element of set {Z} representing a likelihood that a signal detected by one of the signal detectors is associated with a target object divided by a likelihood of such detected signal being noise or clutter, wherein z(i) denotes the ith element of set {Z} indexed by number i;
   a data storage device communicatively coupled with said processing device and storing set {Z}; and
   computer program instructions stored on a computer readable storage medium and executable by said processing device, said computer program instructions enabling said processing device to:
   receive the set {Z} from said data storage device;
   obtain a plurality of elementary symmetric functions for set {Z}, wherein esf(j) denotes the jth elementary symmetric function of set {Z} indexed by number j;
   determine a plurality of secondary symmetric functions for set {Z}, wherein for each value of index i, ssf(j,i) denotes the jth elementary symmetric function of a subset {Z\z(i)} comprising set {Z} with element z(i) removed from set {Z}, and wherein for a particular value of index i, the secondary symmetric functions are determined in accordance with a recursive relationship among the secondary symmetric function to be determined, a previously determined secondary symmetric function, one of the obtained elementary symmetric functions, and the element z(i) removed from set {Z}; and
   output the plurality of secondary symmetric functions.

14. The system of claim 13 wherein said computer program instructions enable said processing device to recursively calculate ssf(j,i) in accordance with the following relationship:

$$ssf(j, i)=esf(j)-z(i)*ssf(j-1,i)$$

while iterating index i upward to the value m and, for each value of index i, iterating index j upward to the value m−1.

15. The system of claim 14 wherein said computer program instructions further enable said processing device to assign ssf(0,i) a fixed value for each value of index i prior to iterating index j upward and recursively calculating ssf(j,i).

16. The system of claim 15 wherein ssf(0,i) is assigned a value of 1.

17. The system of claim 13 wherein said computer program instructions enable said processing device to recursively calculate ssf(j,i) in accordance with the following relationship:

$$ssf(j, i)=(esf(j+1)-ssf(j+1,i))/z(i)$$

while iterating index i upward to the value m and, for each value of index i, iterating index j downward from the value m−2.

18. The system of claim 17 wherein said computer program instructions further enable said processing device to assign ssf(m−1,i) a fixed value for each value of index i prior to iterating index j downward and recursively calculating ssf(j, i).

19. The system of claim 18 wherein ssf(m−1,i) is assigned a value in accordance with the expression:

$$ssf(m-1, i)=esf(m)/z(i).$$

20. The system of claim 13 wherein said computer program instructions enable said processing device to:
   recursively calculate ssf(j,i) in accordance with the following relationship:

$$ssf(j, i)=esf(j)-z(i)*ssf(j-1, i)$$

while iterating index i upward to the value m and, for each value of index i, iterating index j upward until an instability condition is reached; and
   recursively calculate ssf(j,i) in accordance with the following relationship:

$$ssf(j, i)=(esf(j+1)-ssf(j+1, i))/z(i)$$

while iterating index i upward to the value m and, for each value of index i, iterating index j downward from the value m−2 until the instability condition is reached.

21. The system of claim 20 wherein said computer program instructions enable said processing device to determine whether the instability condition is reached by evaluating whether ssf(j,i) divided by esf(j) is less than or greater than a threshold value c.

22. The system of claim 21 wherein the threshold value c=0.5.

23. The system of claim 20 wherein said computer program instructions further enable said processing device to:
   assign ssf(0,i) a fixed value for each value of index i prior to iterating index j upward and recursively calculating ssf(j,i); and assign ssf(m−1, i) a fixed value for each value of index i prior to iterating index j downward and recursively calculating ssf(j,i).

24. The system of claim 23 wherein ssf(0,i) is assigned a value of 1, and wherein ssf(m−1,i) is assigned a value in accordance with the expression:

$$ssf(m-1,i)=esf(m)/z(i).$$

25. A computer program product that updates estimated locations and velocities for a swarm of target objects within a Cardinalized Probability Hypothesis Density (CPHD) multi-target tracker environment including a plurality of signal detectors, said computer program product comprising:
- a computer-readable storage medium having computer program code embodied therein, the computer program code including:
- computer program code enabling a processor executing the code to receive a plurality of signals detected by the plurality of signal detectors, the plurality of signals including target reflected signals comprising signals transmitted from one or more transmitters and reflected from the target objects, and generate a set {Z} comprising a total of m positive real numerical elements, each element of set {Z} representing a likelihood that a signal detected by one of the signal detectors is associated with a target object divided by a likelihood of such detected signal being noise or clutter, wherein z(i) denotes the ith element of set {Z} indexed by number i;
- computer program code enabling the processor executing the code to obtain a plurality of elementary symmetric functions for set {Z}, wherein esf(j) denotes the jth elementary symmetric function of set {Z} indexed by number j;
- computer program code enabling the processor executing the code to determine a plurality of secondary symmetric functions for set {Z}, wherein for each value of index i, ssf(j, i) denotes the jth elementary symmetric function of a subset {Z\z(i)} comprising set {Z} with element z(i) removed from set {Z}, and wherein for a particular value of index i, the secondary symmetric functions are determined in accordance with a recursive relationship among the secondary symmetric function to be determined, a previously determined secondary symmetric function, one of the obtained elementary symmetric functions, and the element z(i) removed from set {Z}; and
- computer program code enabling the processor executing the code to output the plurality of secondary symmetric functions.

* * * * *